United States Patent Office
3,398,269
Patented Aug. 20, 1968

3,398,269
POLYCHROMATIC OPTICAL CORRELATOR
Ross E. Williams, Yonkers, N.Y., assignor to the
United States of America
Filed May 7, 1964, Ser. No. 365,848
15 Claims. (Cl. 235—181)

ABSTRACT OF THE DISCLOSURE

Panchromatic optical correlator provides optical means for correlating simultaneously a set of signal functions against all possible Doppler-distorted variations of a reference without mechanical motions or sequential Doppler processing.

This invention relates to improvements in optical correlators and especially to a polychromatic optical correlator.

A strong need exists in active search and surveillance systems for simultaneous multichannel signal-processing capability. The data acquisition rate and its processing in real time have already strained the capacity of conventional search systems and has led to duplication and parallel operation of complex equipments. The polychromatic optical correlator is one means of satisfying a particular requirement of high data rate receivers matched to the transmitted waveform; it simultaneously processes various Doppler-distorted signals. This simultaneous approach obviates the need for a sequential scan of all the Doppler possibilities, which customarily is multiplexed with a real-time correlation process. The present invention is particularly applicable in low Q, wide-bandwidth systems in which Doppler distortions cannot be approximated by simple frequency shifts of the signal components.

An ideal correlation receiver would cross-correlate the received signal not only against a replica of the transmitted waveform but against the entire range of all possible Doppler-distorted versions of this replica (as dictated by a likely range of target radial-speed values). Such a procedure becomes prohibitively expensive when waveforms of long period are used to obtain increased processing gain. A safe criterion for avoiding significant degradation in the correlation process due to timebase contractions or expansions o fthe type represented by the relation betwen transmitted and received signals frequencies $$\omega_r = \omega\left(1 \pm \frac{2v}{c}\right) = a\omega \qquad (1)$$

where $v$=target radial speed, assumed constant for signal duration T
$c$=signal propagation speed
$a$=Doppler distortion factor
$\omega$=any particular radian frequency of the transmitted signal, and
$\omega_r$=corresponding radian frequency of the received signal is the one which states that timebase errors between the received signal waveform and the reference function with which it is correlated shall not accumulate over the signal duration by more than one-quarter period of the highest frequency contributing significant energy to the power spectrum of the signal. For large signal duration T, the result is an extremely large requirement for the number of distinguishing Doppler channels that must be processed simultaneously to cover all possible target motions. A coarser spacing of Doppler channels leads not so much to a lower resolution on target velocity determination as to an outright failure to detect the target. Therefore, the entire range of Doppler-distorted signals must be scanned with a resolution which is proportional to the signal duration T. Electronic techniques can be used to time-compress the original received signals and scan the entire Doppler range while processing the received signals in real time. However, such techniques are not generally well adapted to multichannel inputs from many receptors. If time compression is used to permit a scan of Doppler distortions, it is not then available to allow a multiplexing of various received signals onto a single timebase so that a single electronic correlator can perform the receiver-multiplexed correlation. Moreover, the number of received signals to be cross-correlated frequently is great enough to require multiple correlation channels if real-time operation is necessary. In such cases, optical correlators have an obvious appeal in their ability to correlate a large number of channels simultaneously without duplication of equipment. The polychromatic optical correlator takes the further step of a simultaneous processing of all Doppler distortions while maintaining the multiple-channel capability at the input, i.e., the polychromatic optical correlator provides simultaneous optical cross-correlation with a reference function of all possible signals reflected from a target moving with unknown velocity.

The present invention provides optical means for simultaneously correlating a set of signal functions against all possible Doppler-distorted variations of a reference without mechanical motions or sequential Doppler processing.

Other objects and many of the attendant advantages of this invention will be readily appreciated as the same becomes better understood by reference to the following detailed description when considered in connection with the accompanying drawings wherein.

Figure 1:
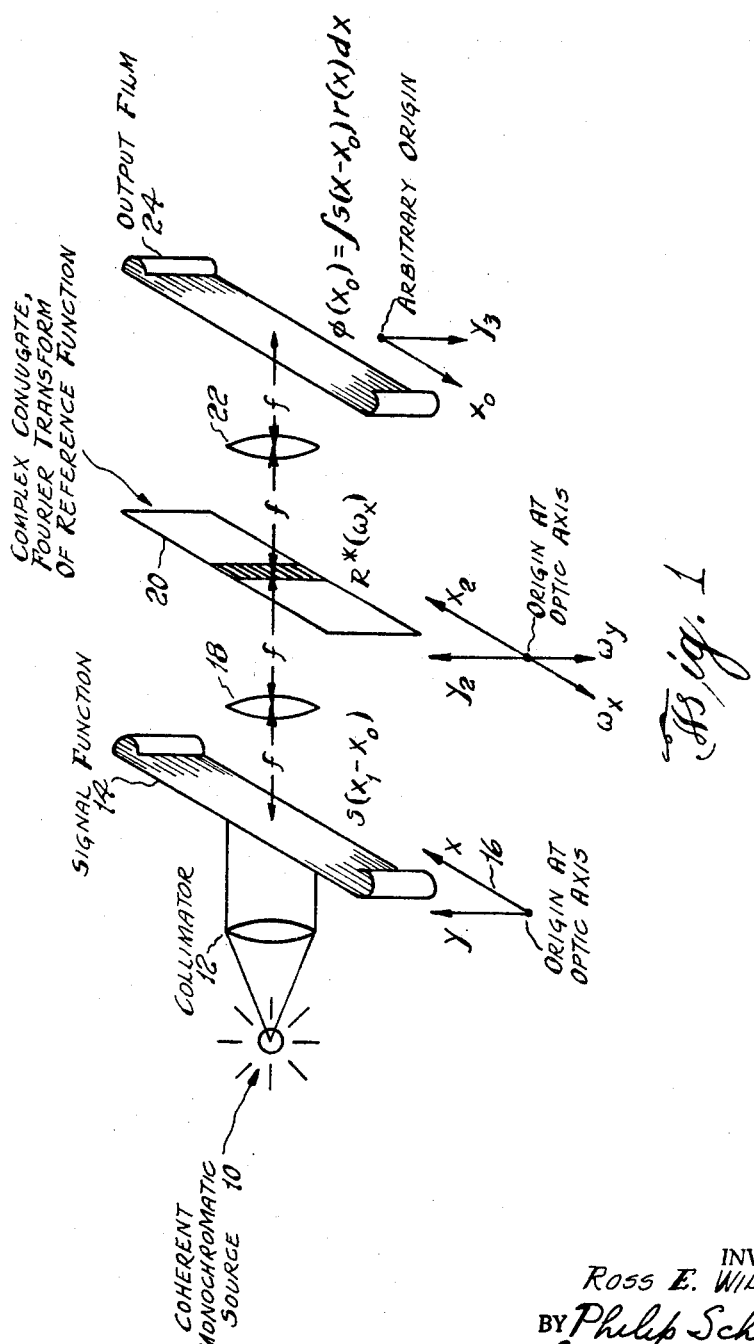
FIG. 1 is a schematic representation of a conventional monochromatic optical correlator.

The principles of coherent optical correlators are well described in the literature. FIG. 1 shows a useful optical correlator in which coherent light from a monochromatic point source 10 is collimated by a spherical lens 12 and projected upon a moving film strip 14 which carries imprinted thereon a signal function $s(x)$ consisting of density variations, for example. Considering $x_0$ to be the $x$ coordinate of the optic axis of the correlator from any arbitrary origin and $x_1$ to be the $x$ coordinate of any point on the signal film 14 from the arbitrary origin 0, then $x=x_1-x_0$, and $s(x)=s(x_1-x_0)$. The $x$— and $y$— coordinate directions are shown at 16.

The signal function plane is spaced a focal length $f$ from a spherical objective, or condensing, lens 18 which is spaced a focal length from a reference plane. In the reference plane, there is a strip of film 20 which bears imprinted thereon a function which is the complex conjugate of the Fourier transform of a reference function; i.e., if the reference function is $v(x)$, the function on film is $R^*(\omega_x)$ in accordance with standard mathematical notation. The Fourier transform $S(\omega_x)$ of the signal function $s(x_1-x_0)$ is projected upon the reference plane film 20 so that the signal function and reference signal Fourier transforms are superimposed upon each other at the reference plane. (A Fourier transform is the frequency-plane transform of a time function and taking the inverse transform of the Fourier transform converts the latter back to a time function. The apparatus provides a Fourier transform of a time function, modifies this transform by insertion of $R^*(\omega_x)$ in the reference plane, and then takes the inverse transformer to produce a time function which is the correlation function.)

The reference plane is spaced a focal length away from another spherical objective lens 22 which in turn is spaced a focal length away from the output plane. An output film strip 24 is located in the output plane, the superimposed Fourier transform signals at the reference plane being projected by the lens 22 upon the output film 24 as a correlation function $\phi(x_0) = \int s(x-x_0)\nu(x)dx$, lens 22 performing an inverse Fourier transformation upon the signals at the reference plane.

In other words, the correlator of FIG. 1 uses a coherent monochromatic light source 10 to project the Fourier transformer $S(\omega_x)$ of the moving time-signal function $s(x_1-x_0)$ upon the frequency-plane, or Fourier, transform $R^*(\omega_x)$ of the reference function, so that the light amplitude distribution transmitted through the frequency plane in which $R^*(\omega_x)$ is inserted is proportional to $S(\omega_x)R^*(\omega_x)$. An inverse Fourier transformer performed by the lens 22 produces the desired correlation function $\phi(x_0)$ in the output plane. This optical arrangement is called a matched filter because it uses, in analogy to electronic matched filters, a spatial frequency filter $R^*(\omega_x)$ matched to the signal $s(x_1)$. In this, or other, configurations a different reference function must be inserted for each different Doppler distortion of the received signal. Therefore, to search the entire range of possible target motions, the reference function must be changed continuously and the various correlation functions for the different Dopplers performed sequentially.

The polychromatic optical correlator depends for its operation upon the fact that a Fourier transformer relationship exists between the light amplitude distributions in planes located with respect to a lens, as shown in FIG. 1. This relationship has been known for some time, but its practical application to optical correlators first found expression in the conventional and matched filter configurations (the matched filter configuration is that of FIG. 1). It is further exploited in the polychromatic correlator where advantage is taken of the fact that the scale factor connecting the coordinate of a frequency plane and the corresponding spatial frequency depends on the light wavelength:

$$\omega_x = -\frac{2\pi}{\lambda f} x_2 \quad (2)$$

where $\omega_x$ = radian spatial frequency associated with $x_2$
$\lambda$ = light wavelength
$f$ = lens focal length, and
$x_2$ = the x-coordinate in the reference-function plane, as shown on FIG. 1

It is obvious from Eq. (2), by its dependence upon $\lambda$, that a continuous range of scale factors connecting $\omega_x$ and $x_2$ can be obtained by varying the color (hence, wavelength) of the light source. In particular, if we define $\omega_x = \omega_r = a\omega$, and relates $x_2$ to $\omega$, Eq. (2) can be made to simulate Eq. (1), wherein the reflected signal-frequency components appear as scale factor distortions of the original signal components (i.e., the frequency of the original signal will, upon reflection from a moving target, be changed by an amount which depends upon the radial speed of the target, and since frequency is defined in terms of wavelength in the polychromatic optical correlator, the frequency change due to target motion can be compensated for by using different wavelengths of light). Thus, a slight broadening of the spectral width of the light-source color filter (which is made as monochromatic as possible for usual correlator configurations) can simulate in the polychromatic correlator the Doppler distortions imposed upon the signal by reflection from a moving target. The use of a polychromatic light source implies light having a spectral content spread continuously over a predetermined band of wavelengths, and this corresponds to varying the scale factor in Eq. 2 over a continuous range of values which, in turn, effectively changes the reference function continuously over a range of values corresponding to the various Doppler distortions of the signal function that occur within the range of possible target radial speeds.

Figure 2:
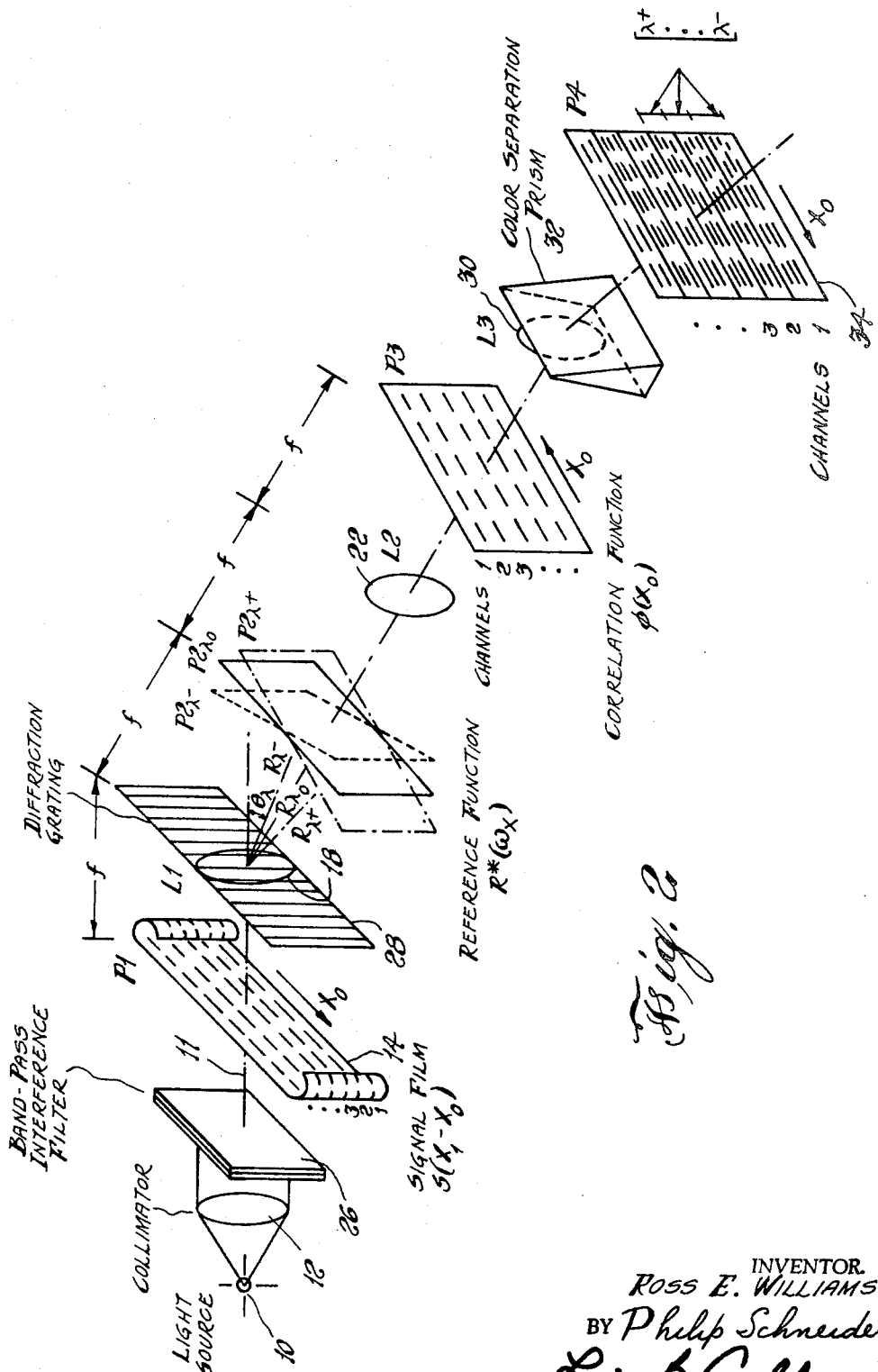
FIG. 2 is a schematic representation of a polychromatic optical correlator which incorporates heterodyning means.

The complete configuration of a polychromatic correlator is shown in FIG. 2. It differs from earlier correlator types by including a broadened spectral width in the light source and filter, a diffraction grating to allow the use of a heterodyned version of the received signal, a single fixed reference function inserted in a frequency plane, and a color separation prism to resolve the various Doppler channels in the output plane. The reference function 20, or replica of the transmitted signal spectrum, is introduced as a matched filter, i.e., the complex conjugate of the Fourier transform of the transmitted signal is inserted in a frequency plane as a filter which matches, for a given center wavelength $\lambda_0$ of the light source, the undistorted transmitted signal (the wavelength in which there is no Doppler distortion). Neglecting the effect of the heterodyning operation performed on the received signal in order to conserve bandwidth prior to insertion into the correlator (to be described hereinafter), a continuous range of Doppler distortions can be accomodated by the continuous spectrum of light-source frequencies without changing the physical pattern of the reference function. This pattern is fixed in terms of the $x_2$ coordinate of Eq. (2), but Eq. (2) shows that a range of corresponding $\omega_x$, and therefore $a$, values is available because of the range of $\lambda$ values present. In this context, the polychromatic correlator can be considered to be a superposition of many coherent, monochromatic correlators with each light source frequency corresponding to a particular Doppler distortion of the transmitted signal. The various light frequencies are separated to resolve Doppler by the prism 32 just to the left of the output plane in FIG. 2.

The polychromatic correlator of FIG. 2 has a point light source 10 of white light which is collimated as before and then passes through an optical bandpass filter 26 to limit the spectral content of the light to a range of wavelengths sufficient to cover the maximum range of speeds to be expected from moving targets. The received signals are printed in horizontal rows or channels (designated 1, 2, 3 ...) along the long dimension of the signal film 14. In ordinary operation of the correlator, the signal film 14 is moved past the light in the direction of the arrow marked with the coordinate $x_0$. The spherical lens 18 lies between the signal plane P1 and the reference, or frequency, plane P2, being spaced a focal length $f$ from each plane.

A polychromatic correlator can correlate unheterodyned Doppler distorted signals as described. However, for any signal function whose spectrum does not extend down to zero cycles, it would make inefficient use of the number of resolvable elements, or time-bandwidth product, in the optical aperture. Any optical system with apertures on the optic axis is necessarily a low-pass filter. Hence, better use of the available bandwidth can be made by heterodyning the signal spectrum down toward zero cycles. The heterodyning operation should not transpose the positive frequency spectrum into the negative frequency region, or vice versa, however, for this would lead to overlays of positive and negative frequency components and distortion of the signal. An expression analogous to Eqs.

Figure 3:
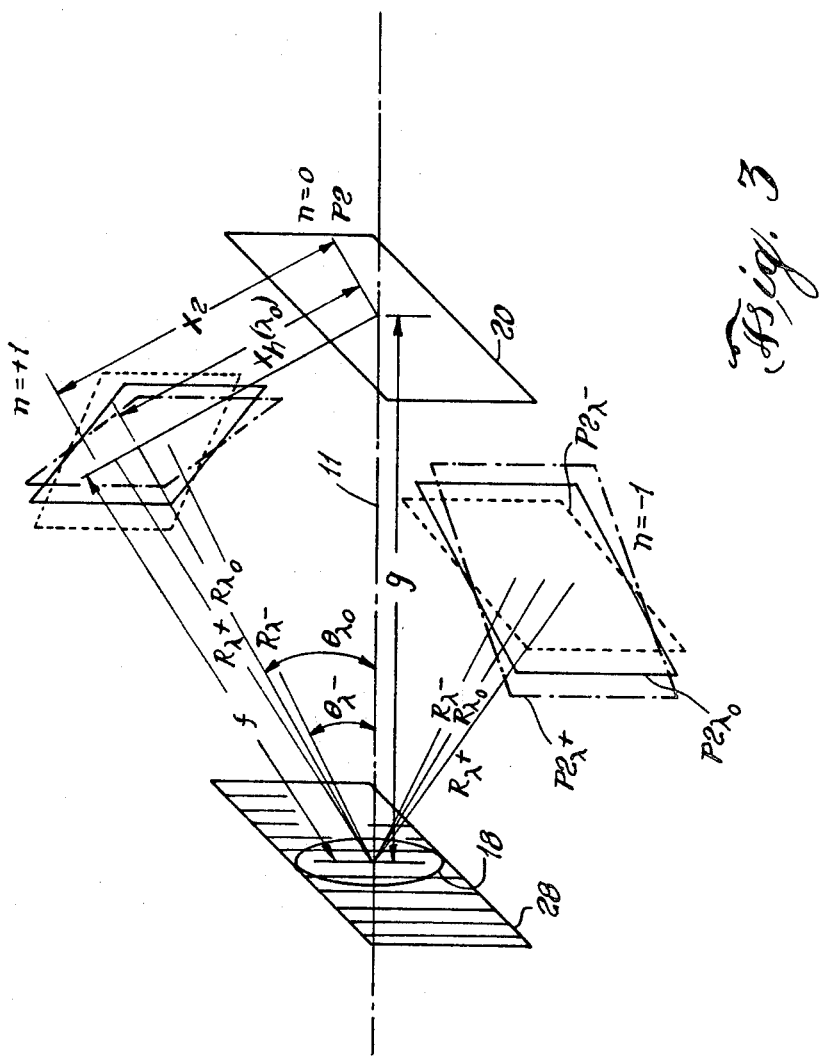
FIG. 3 is a schematic illustration of the diffracted image in the correlator, showing various geometric relationships involved therein.

(1) and (2), but also containing the heterodyning operation, would be written:

$$\omega_x \equiv a\omega - \omega_h = -\frac{2\pi}{\lambda f}x_2 - \omega_h \quad (3)$$

where $\omega_h$=radian frequency shift effected by heterodyning. It is apparent from Eq. (3) that the simple scale factor $2\pi/\lambda f$ relating $\omega_x$ and $x_2$ in Eq. (2) no longer holds in Eq. (3). Thus, the heterodyning operation appears to eliminate the possibility of simulating Doppler distortions by a spread in the light spectrum. However, by inserting a diffraction grating 28 immediately after the first objective lens 18, it is possible to simulate Eq. (3) so that a spread in light frequencies again simulates Doppler distortions when illuminating a heterodyned received-signal function, while the bending of the optic axis into the first-order image of the diffraction grating produces the constant frequency shift $\omega_h$. For signals heterodyned down near, but not through zero cycles, the scale factor relation between $\omega_x$ and $x_2$ which depends upon $\lambda$, and the bending of the optic axis, also dependent upon $\lambda$, just compensate to give a resultant $\omega_h$ which is independent of $\lambda$. This is easily shown as follows:

FIGURE 3 shows in greater detail the bending of the optic axis into the diffraction orders $n=0, \pm 1$. The grating 28 provides a multi-order diffraction pattern of which only the first order image ($n=-1$) is used in this embodiment. The usual diffraction equation gives the locations of principal maxima as $$n\lambda = d\sin\theta \quad (4)$$

where $n$=the diffraction order, and
$d$=slit separation distance on grating
$\theta$=angle of bending of rays from optic axis Also, from FIG. 3, $$x_h(\lambda) = g\sin\theta_\lambda = gn\lambda/d \quad (5)$$

where
$g$=distance between diffraction grating and the $n=0$ plane along the original, undiffracted optic axis using Eq. (4).

Since the coordinates of FIG. 2 are measured with respect to the optic axis 11 before bending, it is necessary to rewrite Eq. (2) in terms of distances measured from the optic axis after bending. It can be shown that the relation of Eq. (2) still holds in the first-order diffracted image provided coordinates are measured from the diffracted optic axis.

$P2_{\lambda 0}$ is the reference, or frequency, plane of light of the center wavelength of the light source in the first order ($n=-1$) diffraction image. It is perpendicular to the diffracted optic axis $R_{\lambda 0}$ of the center wavelength and, measured along the path of this diffracted optic axis ($R_{\lambda 0}$), is a focal length $f$ away from the objective lens 18. The diffracted optic axis is bent away from the undiffracted optic axis by an angle $\theta_{\lambda 0}$; the optic axis for a longer wavelength ($R_{\lambda +}$) is bent through a larger angle $\theta_{\lambda +}$ and the optic axis for a shorter wavelength ($R_{\lambda -}$) is bent through a smaller angle $\theta_{\lambda -}$. The distance $g$ is the distance along the original, undiffracted optic axis 11 between the plane of the center of lens 18 and the frequency plane P2. A right triangle, of which two sides are formed by the distance $g$ and the distance along the diffracted axis $R_{\lambda 0}$ between the center of the lens 18 and the plane $P2_{\lambda 0}$, has as its third side the distance $x_h(\lambda_0)$ along the $x_2$ coordinate axis. Therefore, in terms of the coordinates of FIG. 3, $$\omega_x \equiv a\omega - \omega_h = -\frac{2\pi}{\lambda f}[x_2 - x_h(\lambda)] \quad (6)$$

where $x_h(\lambda)$ is defined in terms of the geometry of FIG. 3.
Substituting from Eq. (5), $$\omega_x \equiv a\omega - \omega_h = -\frac{2\pi}{\lambda f}x_2 + \frac{2\pi ng}{fd} \quad (7)$$

For $n=-1$ in Eq. (7), the term $2\pi g/fd$ represents the constant $\omega_h$, and therefore the frequency shift effected by heterodyning. Then the remainder of Eq. (7) becomes $$a\omega = -\frac{2\pi}{\lambda f}x_2$$

or $$x_2 = -\left(\frac{f}{2\pi}\right)a\lambda\omega = -\left(\frac{f}{2\pi}\right)\lambda_0\omega \quad (8)$$

where $\lambda_0$ is that wavelength corresponding to $a=1$ (no Doppler distortion). It is now obvious from Eq. (8) that the reference function can be constructed as a function of $x_2$, which is related to the transmitted (undistorted) signal frequencies $\omega$ by the constant $-(f/2\pi)\lambda_0$. However, the reference function will also represent any other value of $a$ for which $$a\lambda = \lambda_0 \quad (9)$$

It is apparent from FIG. 3 and Eq. (7) that negative $x_2$ and $n$ values simulate the Doppler distortion and heterodyning operations that have occurred on the positive $\omega_x$ part of the signal spectrum, while positive $x_2$ and $n$ values do the same for the negative spectrum. Now it is obvious that a matched filter operation, of the type shown in FIG. 1, can be carried out by inserting the complex conjugate of the transmitted-signal positive-frequency spectrum in the $\omega_x$ plane, centered a distance $-x_h(\lambda_0)$ from the original axis as shown in FIG. 3, and the complex conjugate of the negative spectrum symmetrically displaced a distance $+x_h(\lambda_0)$ from the original axis. Actually only the positive or the negative spectrum need be used, for the omission of either merely causes a light loss by a factor of two in the intensity of the correlation function in the output plane.

The Fourier transforms of the input signals are superimposed on the complex conjugate of the Fourier transform of the reference function at the reference, or frequency, plane P2. The inverse Fourier transform of this superposition is obtained by means of the spherical lens 22 at the correlation, or inverse transform, plane P3. The inverse transform of this superposition comprises a set of correlation functions $\phi(x_0)$, one for each channel. The light carrying these correlation functions is imaged at what may be designated in this embodiment as the final-image plane P4 on the output film 34, after having been projected through a color separation prism 32. The prism 32 spreads out the light of each channel into a continuous band of its component wavelengths, or colors. The intensification of one of the component colors of a channel indicates the presence of a moving target in that channel and also indicates its speed, according to which particular color component is intensified.

In general, the signal spectrum is complex, and, therefore, both amplitude (opacity) and phase (thickness) recordings must be included in the optical version of the reference function inserted in plane $P2_{\lambda 0}$ (FIG. 2). However, there is a large class of signals for which no phase variation is required. These include all signals whose Fourier transforms are purely real or purely imaginary, corresponding to signals which are purely even or purely odd functions of time. The use of such signals considerably simplifies the construction of an optical reference, for only amplitude recording is then necessary.

Figure 4:
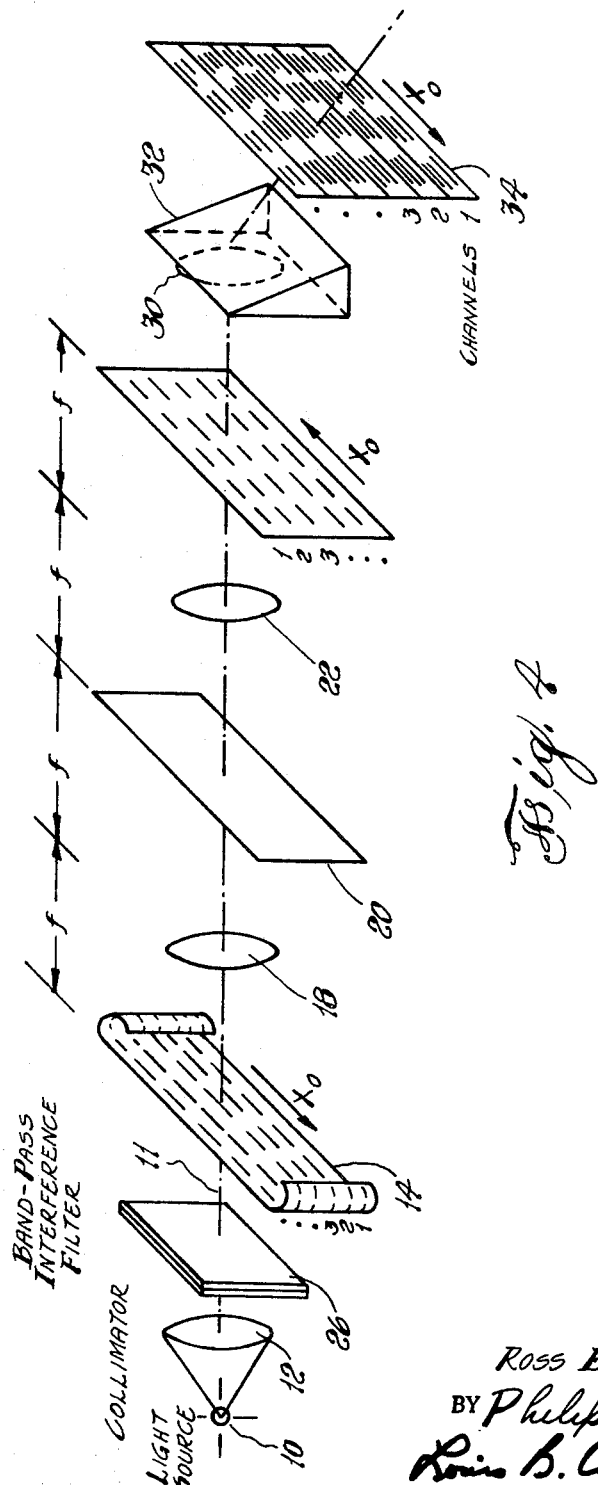
FIG. 4 is a schematic illustration of a polychromatic optical correlator lacking heterodyning means.

FIG. 4 illustrates the structure of a polychromatic correlator which lacks heterodyning means 28. It is very similar to the correlator shown in FIG. 2, except that the diffraction grating 28 is omitted, the optical axis 11 is a single straight line through the apparatus since there is no diffraction and there is only a single reference plane P2 since the optic axis is not diffracted.

The prism preceding the output plane P4 of FIG. 2 separates the various light colors, or Doppler channels, into a continuous spectrum spread vertically. This vertical spread need not produce any overlap of closely spaced signal channels from the signal film (plane P1), for optical magnification between planes P3 and P4 can produce many more resolvable channels on P4 than existed in P1 by enlarging the format. Moreover, the vertical, or $y_1$, spacing of channels in P1 is dictated by the overall resolution of the correlator as a whole (film plus lens components acting as cascaded filters), whereas the channel spacing in plane P4 need only exceed the resolution distance on the film alone. It should be noted that the optical transformation between planes P3 and P4 is a true imaging process and not a Fourier transform relationship. Put in different terms, the power of lens L3 is such that both the Fourier transform and its inverse are accomplished between P3 and P4.

Figure 5:
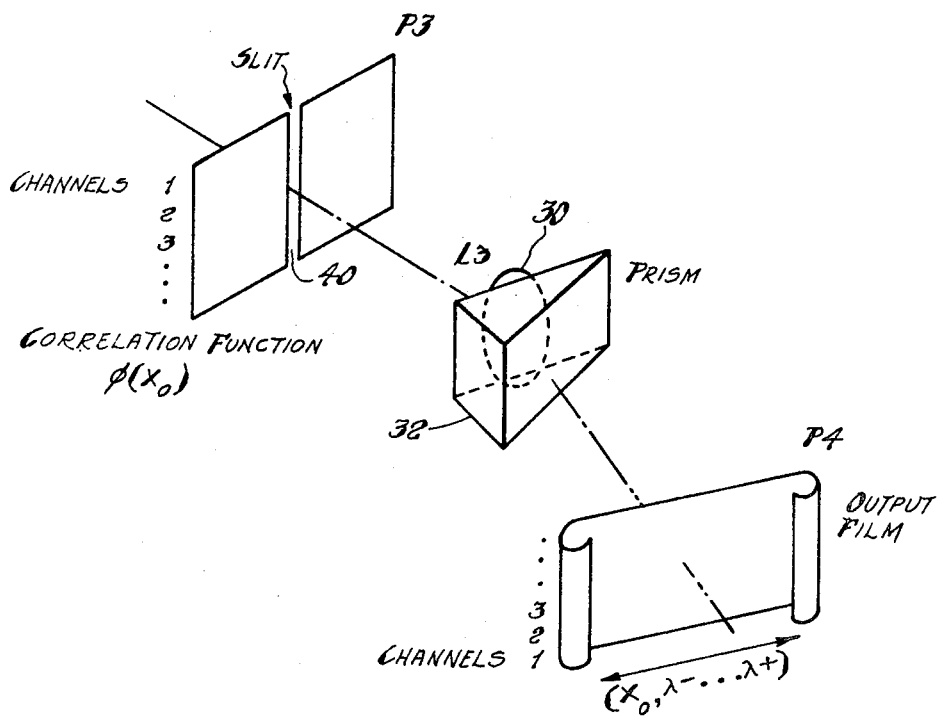
FIG. 5 illustrates an alternate method of employing the prism.

The prism can also be oriented, as shown in FIG. 5, so as to produce a horizontal, or $x$, spread of the spectrum. To avoid confusion between the time axis and Doppler channels, it would then be necessary to insert a slit 40 in the correlation plane P3 and use the $x$ axis in the output plane P4 for the Doppler ($\lambda$) as well as the time ($x_0$) coordinate, as shown in FIG. 5. In this configuration the correlation function $\phi(x_0)$ is not simultaneously observable over a wide $x_0$ range, as it is in the configuration of FIG. 2. Instead, only $\phi(x_0)$ for that $x_0$ value corresponding to the slit position is sampled at one instant of time. With the signal film continuously traversing signal plane P1 in real time, the output through the slit at correlation plane P3 (or its Doppler separated version at P4) provides a time-evolving history of $\phi(x_0)$. To avoid information smear on the output film, the Doppler spread ($\lambda^-$ . . . $\lambda^+$) must be sampled at P4 in time increments $\Delta x_0$, and the Doppler determinations must be multiplexed with the real time $x_0$ variation. This leads naturally to some sort of frame camera for recording information appearing at P4, but the resulting multiplexing of Doppler and time, or $x_0$, information may not be particularly convenient for subsequent data reduction. Moreover, a much shorter exposure time, equal to $\Delta x_0$, is available in the configuration of FIG. 5 than in that of FIG. 2, where a plot of $\phi(x_0)$ for a range of $x_0$ values is available at P3 (or P4) and exposes a film moving slowly through the P3 (or P4) plane synchronously with the signal film motion through P1.

For some purposes the prism can be eliminated entirely and the various Doppler channels left unresolved in plane P4. The correlator then becomes Doppler invariant, regardless of whether or not the original signal function was chosen to be Doppler invariant. This can be a very convenient mode of operation when one wishes not only to make no use of Doppler information but also needs to insure that Doppler distortions of a target reflected signal do not cause the original signal to decorrelate. Of course, a particular constant velocity target motion will then give rise to a received signal which correlates at only one light frequency, and allumination in the output plane from all other parts of the light spectrum will then appear as noise superimposed on the desired correlation function. Therefore, if the Doppler channels are left unresolved in P4, the signal-to-noise ratio in plane P1 must be adequate to insure a detection at P4 in the presence of noise from other light frequencies.

Obviously many modifications and variations of the present invention are possible in the light of the above teachings. It is therefore to be understood that within the scope of the appended claims the invention may be practiced otherwise than as specifically described.

I claim:
1. A polychromatic optical correlator capable of providing all Doppler distortions of a single reference signal and simultaneously correlating therewith a set of signal functions comprising, in combination:
   signal-function means providing a set of signal functions;
   reference-function means, spaced from said signal-function means, providing a single fixed reference function against which said set of signal functions and a predetermined range of Doppler distortions thereof are to be correlated;
   light-source means for illuminating said set of signal functions with coherent, collimated light of broad useful spectral bandwidth;
   means for deriving, optically and simultaneously, the Fourier transforms of said set of signal functions and superimposing these transforms on said reference function; and
   means for optically providing correlation functions comprising the inverse Fourier transforms of said superimposed signal and reference functions.

2. A correlator as set forth in claim 1, in which said fixed reference function is a Fourier transform.

3. A correlator as set forth in claim 2, additionally comprising:
   means separating the light carrying each said correlation function into a band composed of its spectral components.

4. A correlator as set forth in claim 2, additionally comprising:
   diffraction means for deriving a first-order diffraction image from the light carrying said Fourier transforms of said set of signal functions, said diffraction means being located between said signal-function means and said reference-function means, all enumerated means after said diffraction means operating on the light comprising said first-order diffraction image.

5. A polychromatic optical correlator capable of providing all Doppler distortions of a single reference signal and simultaneously correlating therewith a set of signal functions comprising, in combination:
   signal-function means providing a set of time-signal functions;
   reference-function means, spaced from said signal-function means, providing a single fixed reference function against which said set of signal functions and a predetermined range of Doppler distortions thereof are to be correlated simultaneously, said reference function being in the form of a frequency-plane transform of a time signal;
   light-source means for illuminating said set of signal functions with coherent, collimated light of broad useful spectral bandwidth,
   means for deriving, optically and simultaneously, the frequency-plane transforms of said set of signal functions and superimposing these transforms on said reference function; and
   means for optically providing time-signal correlation functions comprising the inverse transforms of said frequency-plane transforms of said superimposed signal and reference functions.

6. A correlator as set forth in claim 5, additionally comprising:
   means separating the light carrying each said correlation function into a band composed of its spectral components.

7. A correlator as set forth in claim 5, additionally comprising:
   diffraction means for deriving a first-order image from the light carrying said frequency-plane transforms of said signal functions, said diffraction means being located between said signal-function means and said reference-function means, all enumerated means after said diffraction means operating on the light comprising said first-order diffraction image.

8. A polychromatic optical correlator capable of providing all Doppler distortions of a single reference signal and simultaneously correlating therewith a set of signal functions comprising, in combination:
   signal function means providing a set of signal functions;
   reference function means, spaced from said signal-function means, providing a single fixed reference function against which said set of signal functions and a predetermined range of Doppler distortions thereof are to be correlated;

light-source means for illuminating said set of signal functions with coherent, collimated light of a predetermined useful spectral bandwidth greater than that from a monochromatic light source;

means for deriving, optically and simultaneously, the Fourier transforms of said set of signal functions and superimposing these transforms on said reference function;

and means for optically providing correlation functions comprising the inverse Fourier transforms of said superimposed signal and reference functions.

9. A correlator as set forth in claim 8, in which said fixed reference function is a Fourier transform.

10. A correlator as set forth in claim 9, additionally comprising:

means separating the light carrying each said correlation function into a band composed of its spectral components.

11. A correlator as set forth in claim 9, additionally comprising:

diffraction means for deriving a first-order diffraction image from the light carrying said Fourier transforms of said set of signal functions, said diffraction means being located between said signal-function means and said reference-function means, all enumerated means after said diffraction means operating on the light comprising said first-order diffraction image.

12. A polychromatic optical correlator capable of providing all Doppler distortions of a single reference signal and simultaneously correlating therewith a set of signal functions comprising, in combination:

signal-function means providing a set of signal functions;

reference-function means, spaced an integral number of two focal lengths from said signal-function means, providing a single fixed reference function against which said set of signal functions and a predetermined range of Doppler distortions thereof are to be correlated;

light-source means for illuminating said set of signal functions with coherent, collimated light of a predetermined useful spectral bandwidth greater than that from a monochromatic light source;

means for deriving, optically and simultaneously, the Fourier transforms of said set of signal functions and superimposing these transforms on said reference function, said means comprising lens means located between said signal-function means and said reference-function means and spaced a focal length away from each;

and means for optically providing correlation functions comprising the inverse Fourier transforms of said superimposed signal and reference functions, said means comprising lens means spaced a focal length away from said reference-function means, all said means being located along a single optic axis.

13. A correlator as set fourth in claim 12, in which said fixed reference function is a Fourier transform.

14. A correlator as set forth in claim 13, additionally comprising:

means separating the light carrying each said correlation function into a band composed of its spectral components, said separating means comprising prismatic means.

15. A correlator as set forth in claim 13, additionally comprising:

diffraction means for deriving a first-order diffraction image from the light carrying said Fourier transforms of said set of signal functions, said diffraction means being located between said signal-function means and said reference-function means, all enumerated means after said diffraction means operating on the light comprising said first-order diffraction image, said light-source means, said signal-function means, said derivation means and said diffraction means being located along an undiffracted optic axis, and the remainder of said means being located along the first-order diffraction image axis.

References Cited

UNITED STATES PATENTS

| | | | |
|---|---|---|---|
| 2,712,415 | 7/1955 | Piety | 235—194 |
| 2,834,956 | 5/1958 | Harris. | |
| 2,839,149 | 6/1958 | Piety. | |
| 3,030,021 | 4/1962 | Ferre | 235—181 |

MALCOLM A. MORRISON, *Primary Examiner.*

J. F. RUGGIERO, *Assistant Examiner.*